No. 695,517. Patented Mar. 18, 1902.
G. WILCOX.
PROCESS OF SIDE SEAMING METAL CANS.
(Application filed Oct. 13, 1900. Renewed Oct. 29, 1901.)
(No Model.)

Witnesses:
G. S. Noble
J. D. McMahon.

Inventor,
George Wilcox.
By Joseph G. Dennison
Att'y.

UNITED STATES PATENT OFFICE.

GEORGE WILCOX, OF LOS ANGELES, CALIFORNIA, ASSIGNOR TO AMERICAN CAN COMPANY, OF JERSEY CITY, NEW JERSEY, A CORPORATION OF NEW JERSEY.

PROCESS OF SIDE-SEAMING METAL CANS.

SPECIFICATION forming part of Letters Patent No. 695,517, dated March 18, 1902.

Application filed October 13, 1900. Renewed October 29, 1901. Serial No. 80,459. (No specimens.)

*To all whom it may concern:*

Be it known that I, GEORGE WILCOX, a citizen of the United States, residing at Los Angeles, in the county of Los Angeles and State of California, have invented a new and useful Process of Side-Seaming Metal Cans, of which the following is a specification.

My improvement relates to the side seam formed in sheet-metal cans before the heads are applied, and has for its objects to economize the use of soldering metal, to facilitate the mechanical work involved in forming the seam, and to make a better and more reliable seam.

To these ends the invention consists in initially applying a rib of solder to the external surface of the sheet from which the can-body is to be formed parallel with one of the edges to be interlocked, forming one member of the interlock in the margin left by said rib and the other member in the opposite edge in such manner that when interlocked the rib shall be immediately proximate to the mouth of the seam, interlocking said seam, placing the can in a horizontal position with the seam at one side and the rib of solder uppermost, and exposing said seam to a fusing heat to melt the solder and cause it to flow down and fill the interlocked seam.

Figure 1:
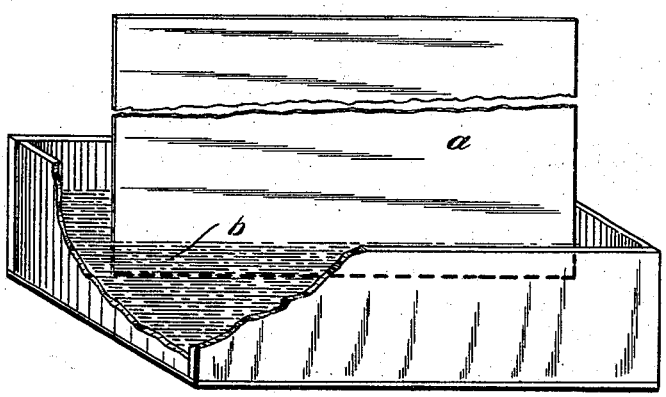
Figure 2:
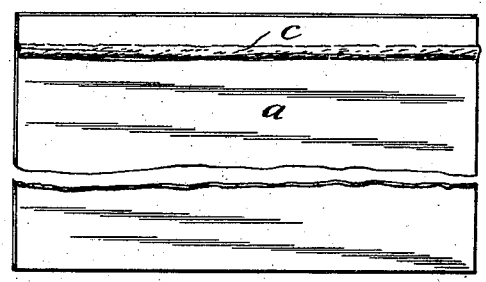
Figure 3:
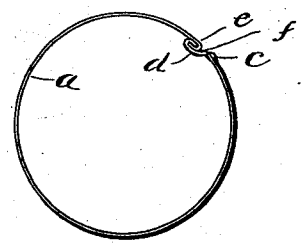
Figure 4:
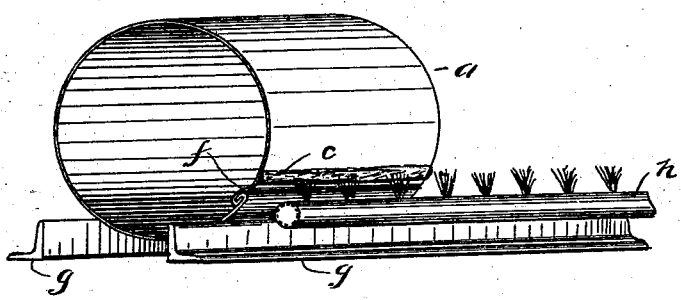

In the drawings, wherein I have represented symbolically the steps in the most approved form of my process, Figure 1 represents a sheet-metal blank being dipped by one edge into a bath of molten solder. Fig. 2 represents the same blank removed from the bath and inverted that the solder may flow back from the edge and cool at a sufficient distance therefrom into a parallel rib. Fig. 3 is a transverse section through the can-body after the edges have been interlocked, but before the seam is completed, showing the said rib on the exterior surface only of the can and immediately above the mouth of the seam, it being supposed in this instance that the film of solder taken up from the bath on the inner or reverse surface was removed by wiping or scraping immediately after the bath and before it had time to retreat and harden in a duplicate rib; and Fig. 4 is a perspective view showing the arrangement of the can-body or cylinder on horizontal slideways in relation to laterally-disposed burners for the purpose of melting the solder and completing the seam.

Referring now to said drawings, $a$ represents a blank of sheet metal of the proper size and outline to form the body of a can. One of the edges of this blank intended for the seam preferably having been first prepared with flux is as the initial step dipped into the bath $b$ of molten solder, as represented in Fig. 1, care being taken to preserve its substantial parallelism with said surface. After dipping and before the solder has chilled the blank is inverted, as represented in Fig. 2, that the solder may creep back from the edge and harden in a rib $c$, parallel with said edge, but sufficiently removed therefrom to permit the interlocking fold to be formed in the margin left between said rib and edge. Before the solder has set, however, that portion adhering to the prospective inner or reverse surface may be wiped or scraped off, and also, if thought advisable, the thin film adhering between the rib and edge on the opposite side. The interlock is now formed by means of an inward fold $d$ in the aforesaid margin adjoining the rib and an outward fold $e$ along the opposite edge of the blank, so that when brought together, as in Fig. 3, the rib shall be immediately adjacent to the mouth $f$ of the seam. Finally the can is placed in a horizontal position, with the seam at its side and the rib of solder uppermost, as, for instance, upon ways $g$, along which it may be carried and exposed to the fusing heat of laterally-disposed burners $h$, whereby the rib is melted and runs down into said seam, filling it evenly and truly and setting therein as it leaves the influence of the flames.

While I have described the rib as being disposed on the exterior of the can-body when exposed to the soldering heat, it is evident that by simple reversal of bends as to folds and body it may be disposed interiorly and still caused to flow therein by the heat from the burners striking through the wall of the can, and such disposition I consider within the scope of my invention.

I claim—

1. The process of side-seaming can-bodies, consisting in primarily forming a rib of solder parallel with but removed from one edge of the blank, then bending an interlocking fold along the margin thus left and away from the rib, and a reverse interlocking fold along the opposite edge, bringing the two folds together to form an interlocked seam with the rib immediately adjacent to the mouth thereof, and finally placing the can-body thus assembled in or about a horizontal position with the seam at the side and the rib above said seam and subjecting said seam and rib to heat to fuse the solder and fill the seam.

2. The process of side-seaming can-bodies, consisting in initially dipping one edge of the blank in a bath of molten solder, next inverting said blank to permit the solder to creep down and cool in a rib parallel with but measurably removed from said edge, then bending an interlocking fold along the margin thus left and a reverse fold along the opposite edge, then bringing the two folds together and interlocking them, and finally placing the can-body thus assembled in or about a horizontal position with the seam at the side and the rib above the seam, and applying heat to fuse the rib and cause it to run down into and fill the seam.

3. The process of side-seaming can-bodies, consisting in initially dipping one edge of the blank in a bath of molten solder, inverting said blank to permit the solder to creep down and cool in a rib parallel with but measurably removed from one edge, wiping or scraping the solder from the reverse side of the blank before such cooling is effected, bending an interlocking fold in the margin between said rib and edge and away from the rib, and a reverse interlocking fold in the opposite edge, bringing said folds together and interlocking them, and then placing the can-body thus assembled in or about a horizontal position with the seam at the side and the rib above said seam and applying heat along said seam and rib to fuse the rib.

4. The process of making can-bodies consisting in first dipping the end edge of the blank in molten solder, turning the dipped edge uppermost to form a solder rib thereon, forming the can-body lapping or bringing the edges thereof together, turning the can-body to bring its lapped edges or seam to one side of the vertical and applying heat to the solder rib on the can-body, substantially as specified.

5. The process consisting in first forming a rib-like deposit of solder on a can-body blank at one end adjacent to but removed from the seam-section forming the can-body, and fusing the solder rib and flowing the solder into the seam substantially as specified.

6. The process of making can-bodies consisting in applying molten solder to the end edge of the can-body blank, turning such edge uppermost before the solder sets, forming the can-body and applying heat to fuse the solder and flow it into the seam, substantially as specified.

7. The process consisting in dipping the end edge of a can-body blank into a bath of molten solder, turning the dipped edge uppermost before the solder sets, forming the can-body and fusing the solder and flowing it into the seam, substantially as specified.

GEORGE WILCOX.

Witnesses:
  G. G. JOHNSON,
  JOSEPH G. PARKINSON.